J. A. HYDE.
Runner-Attachment for Vehicles.

No. 159,327.    Patented Feb. 2, 1875.

WITNESSES:
A. W. Almqvist
A. F. Terry

INVENTOR:
John A. Hyde
BY
Munn
ATTORNEYS.

UNITED STATES PATENT OFFICE.

JOHN A. HYDE, OF ENGLEWOOD, NEW JERSEY.

IMPROVEMENT IN RUNNER ATTACHMENTS FOR VEHICLES.

Specification forming part of Letters Patent No. 159,327, dated February 2, 1875; application filed December 19, 1874.

*To all whom it may concern:*

Figure 1:
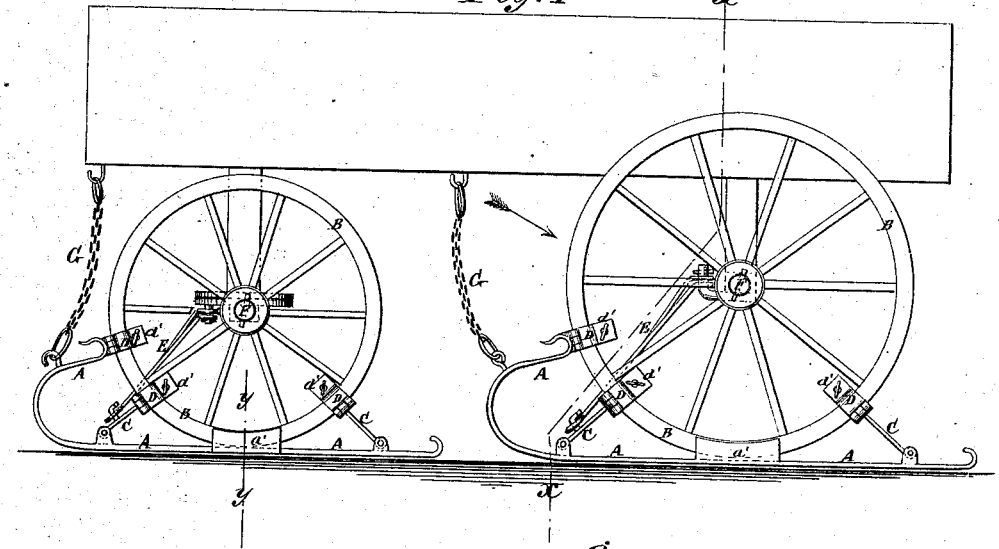
Figure 2:
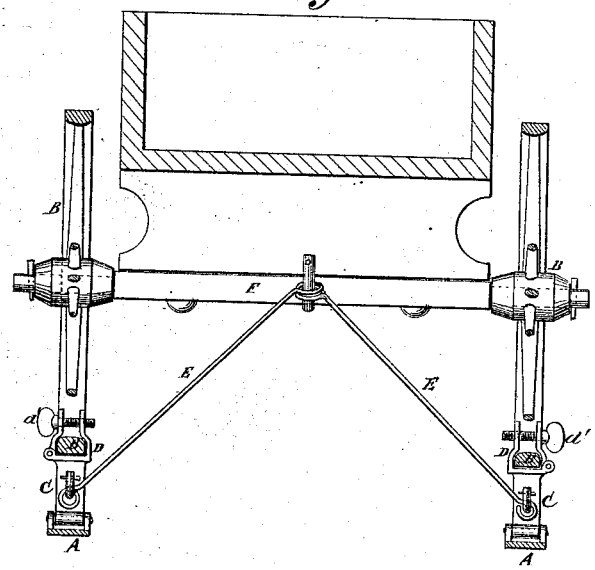
Figure 3:

Be it known that I, JOHN A. HYDE, of Englewood, in the county of Bergen and State of New Jersey, have invented a new and useful Improvement in Runner Attachment for Wagons, of which the following is a specification:

Figure 1 is a side view of a wagon to which my improvement has been applied. Fig. 2 is a detail cross-section of the same, taken through the line $x\ x$, Fig. 1. Fig. 3 is a detail cross-section of the wheel-rim and the runner, taken through the line $z\ z$, Fig. 1.

Similar letters of reference indicate corresponding parts.

The invention will first be fully described, and then pointed out in the claims.

A is the runner, upon the side edges of the middle part of which are attached upwardly-projecting flanges $a'$, to receive the rim of the wheel B between them, and thus keep the said wheel in place. To the runner A, in front and rear of the flanges $a'$, are hinged the lower ends of arms C, to the upper ends of which are attached the clamps D. One arm of the clamps D is hinged to the base of the said clamps, so that it can be readily turned back to enable the clamps to be readily applied to and detached from the rim of the wheel B. The clamps D are secured to the rim of the wheel B by a hand-screw, $d'$, which passes through a hole in one jaw, and screws into a screw-hole in the other jaw of the said clamps. The forward ends of the runners A are curved upward, and have clamps D attached to them, to be secured to the rims of the wheels B. The runners A are further secured in place by brace-rods E, the outer ends of which are secured to the forward part of the said runners A by being hooked upon hooks attached to the forward parts of said runners, or to the forward arms C. The inner ends of the brace-rods E are hooked upon hooks attached to the centers of the axles F of the wagon. To the forward parts of the runners A are attached the lower ends of the guard-chains G. The upper ends of the rear chains G are hooked upon hooks attached to the wagon-body H, and the upper ends of the forward chains G are hooked upon hooks attached to the wagon-body, or to the thills or pole of the wagon. The guard-chains G prevent the forward ends of the runners A from dropping too low in passing into and out of hollows in the roadway.

In the case of light or short wagons only two runners, A, need be used, each runner being made sufficiently long to receive the fore and hind wheels of one side of the wagon. In this case the forward parts of the runners may be so curved as to pass along the rim of the fore wheels. The runners A may be made of iron plated with steel, or they may have steel shoes attached to them in the manner of sleigh-runners. The runners A are designed to be carried beneath the wagon-body, as skids are now carried, or they may be carried in said wagon-body, as may be convenient.

Having thus described my invention, I claim as new and desire to secure by Letters Patent—

1. The clamps D, with one hinged jaw, and provided with a hand-screw, $d'$, in combination with the runners A and arms C, to enable said runners to be secured to the wheels of a wagon, substantially as shown and described.

2. The hinged arms C, in combination with the runners A and clamps D, substantially as shown and described.

JOHN A. HYDE.

Witnesses:
JAMES T. GRAHAM,
T. B. MOSHER.